United States Patent
Bourguet et al.

[15] 3,669,903

[45] *June 13, 1972

[54] CATALYTIC CRACKING PROCESS

[72] Inventors: Jean M. Bourguet; Francis D. Hart, both of Le Vesinet, France

[73] Assignee: Mobil Oil Corporation (formerly Socony Mobil Oil Company, Inc.)

[ * ] Notice: The portion of the term of this patent subsequent to July 7, 1981, has been disclaimed.

[22] Filed: June 16, 1966

[21] Appl. No.: 557,910

Related U.S. Application Data

[63] Continuation of Ser. Nos. 471,785, June 24, 1965, abandoned, and Ser. No. 262,258, March 1, 1963, abandoned, and Ser. No. 62,870, Oct. 17, 1960, Pat. No. 3,193,493.

[52] U.S. Cl. ............................252/455, 208/111, 208/120, 208/216, 260/671, 260/683.3, 260/683.9

[51] Int. Cl. .........................................................B01j 11/40
[58] Field of Search ..........................208/119, 120; 252/455

[56] References Cited

UNITED STATES PATENTS

| | | | |
|---|---|---|---|
| 2,971,903 | 2/1961 | Kimberlin et al. | 208/119 |
| 3,210,267 | 10/1965 | Plank et al. | 208/120 |

*Primary Examiner*—Delbert E. Gantz
*Attorney*—Oswald G. Hayes and Donald L. Dickerson

[57] ABSTRACT

Hydrocarbon conversion catalysts comprising crystalline aluminosilicates containing rare earths and other metals from Groups IB through VIII of the Periodic Table, and having a low alkali metal content. They are useful in hydrocarbon conversion processes such as cracking, hydrocracking hydrodesulfurization, alkylation, dehydrogination, and hydrogenation.

2 Claims, No Drawings

CATALYTIC CRACKING PROCESS

This is a continuation of Ser. Nos. 471,785 filed June 24, 1965; 262,258 filed Mar. 1, 1963 and now abandoned; and 62,870 filed Oct. 17, 1960 and now U.S. Pat. No. 3,193,493.

This invention relates to an improved process for effecting conversion of hydrocarbons. More particularly, the present invention is directed to a process for cracking a hydrocarbon oil heavier than gasoline by subjecting the same to contact under catalytic cracking conditions with an unusual catalyst characterized by the ability to afford an exceptionally high conversion of said oil with accompanying enhanced yield of gasoline.

The invention is further directed to an improved aluminosilicate cracking catalyst characterized by unusual activity, selectivity and stability to deactivation by steam. The catalyst described herein further possesses exceptional resistance to nitrogen deactivation and is thus particularly adapted to treatment of charge stocks high in nitrogen content. As is well known, there are numerous materials both of natural and synthetic origin which have the ability to catalyze the cracking of hydrocarbons. However, the mere ability to catalyze cracking is far from sufficient to afford a catalyst of commercial significance. Of the presently commercially available cracking catalysts, a synthetic silica-alumina composite catalyst is by far the most widely used. While such type catalyst is superior in many ways to the earlier employed clay catalysts and is fairly satisfactory, it is subject to improvement particularly in regard to its ability to afford a high yield of useful product with a concomitant small yield of undesirable product.

Thus, commercial catalytic cracking has been carried out by contacting a hydrocarbon charge in the vapor of liquid state with a catalyst of the foregoing type under conditions of temperature, pressure and time to achieve substantial conversion of the charge to lower boiling hydrocarbons. The reaction which takes place is essentially a cracking to produce lighter hydrocarbons but is accompanied by a number of complex side reactions such as aromatization, polymerization, alkylation and the like. As a result of these complex reactions a carbonaceous deposit is laid down on the catalyst commonly called "coke". The deposition of coke tends to seriously impair the catalytic efficiency of the catalyst for the principal reaction and the conversion reaction is thereafter suspended after coke to the extent of a few percent by weight has accumulated on the catalyst. The catalytic surface is then regenerated by burning the coke in a stream of oxidizing gas and the catalyst is returned to the conversion stage of the cycle.

As will be realized, coke and other undesired products are formed at the expense of useful products such as gasoline. It will also be evident that during the period of regeneration the catalyst is not being effectively employed for conversion purposes. It accordingly is highly desirable not only to afford a large over-all conversion of the hydrocarbon charge, i.e., to provide a catalyst of high activity, but also to afford an enhanced yield of useful product such as gasoline while maintaining undesired products such as coke at a minimum. The ability of a cracking catalyst to so control and direct the course of conversion is referred to as selectivity. Thus, an exceedingly useful and widely sought characteristic in a cracking catalyst is selectivity.

Another important property of a commercial cracking catalyst is the ability to resist poisoning by nitrogen when utilized in effecting conversion of a high nitrogen content charge stock.

Still another important property desirable in a cracking catalyst is steam stability, i.e., the ability not to become deactivated in the presence of steam at an excessively high rate. As a result of coke formation, it has generally been necessary to regenerate the catalyst at frequent intervals first by stripping out entrained oil by contacting with steam and then burning off carbonaceous deposits by contacting with an oxygen-containing gas at an elevated temperature. However, it has been found that the cracking activity of the catalyst deteriorates upon repeated use and regeneration and that the silica-alumina catalysts heretofore employed are very sensitive to steam. Since steaming has been found to be the most effective way of removing entrained oil from the catalyst prior to regeneration with air and since steam is encountered in the seals and kiln of a commercial catalytic cracking unit, it is apparent that a catalyst characterized by good steam stability is definitely to be desired.

In accordance with the present invention, there has now been discovered a catalyst possessing the unique combination of the above-described desirable characteristics. The catalyst of the present invention comprises either a rare earth metal aluminosilicate or an aluminosilicate containing a mixture of rare earth and at least one other metal selected from Group IB through VIII of the Periodic Table. These catalysts are prepared by base-exchanging a crystalline alkali metal aluminosilicate having uniform pore openings between 6 and 15 Angstrom units with rare earth metal or a mixture of rare earth and other metals to replace at least about 75 percent of the original alkali metal content of said alkali metal aluminosilicate with said ions and to effectively reduce the alkali metal content of the resulting composite to below 4 percent by weight, washing the base-exchanged material free of soluble anions, drying and thereafter thermally activating the product by heating at a temperature in the approximate range of 500° to 1200° F. for a period of between about 1 and about 48 hours.

In one embodiment, the present invention thus affords a process for cracking heavy petroleum hydrocarbons to lighter materials boiling in the range of gasoline in the presence of a rare earth, mixed rare earth-metal aluminosilicates having uniform pore openings.

In another embodiment the present invention provides a process for effecting conversion of hydrocarbons by contacting the same with a catalyst having exceptional stability, activity and selectivity prepared by contacting a crystalline alkali metal aluminosilicate zeolite having uniform pore openings between 6 and 15 Angstrom units with a solution containing ions of metals selected from the group consisting of rare earth metals and mixtures of rare earth metals and other metals selected from Group IB – VIII of the Periodic Table to effect base exchange of at least about 75 percent of the alkali metal ions of said zeolite with the aforesaid metal ions and to effectively reduce the content of alkali metal of the resulting composite to below 4 percent by weight, washing the base-exchanged material free of soluble anions, drying and thermally activating the washed product by heating to a temperature in the approximate range of 500° to 1200° F. to effect at least partial conversion of the metal ion introduced by base-exchange to a catalytically active state.

Another embodiment of the invention affords a process for cracking heavy petroleum hydrocarbons to lighter materials boiling in the gasoline range by contacting the same under catalytic cracking conditions with a catalyst resulting from contact with a crystalline alkali metal aluminosilicate zeolite having uniform pore openings between 6 and 15 Angstrom units with a solution of an ionizable rare earth metal compound and other metals or compounds to replace, by base-exchange, at least 75 percent and preferably more than 90 percent of the alkali metal content of said zeolite with the aforementioned metals and to effectively reduce the alkali metal content thereof below about 4 percent and preferably to less than about 1 percent by weight, washing the base-exchanged material free of soluble anions, drying and thermally activating the washed product by heating to a temperature in the approximate range of 500° to 1200° F. for a period of between about 1 and about 48 hours.

The crystalline alkali metal aluminosilicates employed in preparation of the catalysts described herein are zeolites. Such substances have been generally described by Barrer in several publications and in U.S. Pat. No. 2,306,610 and U.S. Pat. No. 2,413,134. These materials are essentially the dehydrated forms of crystalline natural or synthetic hydrous siliceous zeolites containing varying quantities of alkali metal and aluminum with or without other metals. The alkali metal atoms, silicon, aluminum and oxygen in these zeolites are arranged in the form of an aluminosilicate salt in a definite and consistent crystalline pattern. The structure contains a large number of small cavities, interconnected by a number of still smaller holes or channels. These cavities and channels are precisely uniform in size. The alkali metal aluminosilicate zeolite used in preparation of the catalysts described herein has a uniform pore structure comprising openings characterized by an effective pore diameter of between 6 and 15 Angstroms.

The aluminosilicates can be described as a three dimensional framework of $SiO_4$ and $AlO_4$ tetrahedra in which the tetrahedra are cross linked by the sharing of oxygen atoms whereby the ratio of total aluminum and silicon atoms to oxygen atoms is 1:2. In their hydrated form, the aluminosilicates may be represented by the formula:

$$M_2O:Al_2O_3:wSiO_2:yH_2O$$

wherein M represents at least one cation which balances the electrovalence of the tetrahedra, n represents the valence of the cation, $w$ the moles of $SiO_2$ and $Y$ the moles of $H_2O$. The cation can be one or more of a number of metal ions, depending upon whether the aluminosilicate is synthesized or occurs naturally.

Typical cations of the starting aluminosilicates are, in general, the alkali metals and alkaline earth metals, although others may be used. Although the proportions of inorganic oxides in the silicates and their spatial arrangements may vary affecting distinct properties in the aluminosilicates, a main characteristic of these materials is their ability to undergo dehydration and rehydration without substantially affecting the $SiO_4$ and $AlO_4$ framework.

Aluminosilicates falling within the above formulae are well known and include synthesized aluminosilicates, natural aluminosilicates, and aluminosilicates derived from certain caustic treated clays. Since the primary object of this invention is to provide a novel and unusual cracking catalyst, the aluminosilicate zeolite should have a pore size sufficiently large to afford entry and egress of the desired reactant molecules. In this regard, crystalline aluminosilicates having uniform pore openings of a size of at least 6 angstrom units are desired. Particularly preffered aluminosilicates are the faujasites, both natural and the synthetic X and Y types. Aluminosilicate derived from caustic treated clays may also be used. Of the clay materials, montmorillonite and kaolin families are representative types which include the sub-bentonites, such as bentonite, and the kaolins commonly identified as Dixie, McNamee, Georgia, and Florida clays or others in which the main mineral constituent is halloysite, kaolinite, dickite, nacrite, or anauxite. Such clays may be used in the raw state as originally mined or initially subjected to calcination, acid treatment or chemical modification. One way to render the clays suitable for use is to treat them with sodium hydroxide or potassium hydroxide, preferably in admixture with a source of silica, such as sand, silica gel or sodium silicate, and calcine at temperatures ranging from 230° to 1600° F. Following calcination, the fused material is crushed, dispersed in water and digested in the resulting alkaline solution. During the digestion, materials with varying degrees of crystallinity are crystallized out of solution. The solid material is separated from the alkaline material and thereafter washed and dried. The treatment can be effected by reacting mixtures falling within the following weight ratios:

| | |
|---|---|
| Na$_2$O/clay (dry basis) | 1.0–6.6 to 1 |
| SiO$_2$/clay (dry basis) | 0.01–3.7 to 1 |
| H$_2$O/Na$_2$O (mole ratio) | 35–100 to 1 |

It is to be understood that mixtures of the various aluminosilicates previously set forth can be employed as well as individual aluminosilicates.

As has heretofore been stated, the catalysts utilized in the present process are prepared by base-exchanging a crystalline alkali metal aluminosilicate, such as described hereinabove, having a structure of rigid three dimensional networks characterized by a uniform effective pore diameter between 6 and 15 Angstrom units with rare earth metal ions or a mixture of rare earth and other metal ions, washing the resulting base-exchanged material free of soluble anions, drying the washed composite and subjecting the same to a thermal activating treatment.

The base-exchange solutions employed may be contacted with the crystalline zeolite of uniform pore structure in the form of a fine powder, a compressed pellet, extruded pellet or other suitable particle shape. It has been established that the desired base-exchange may be effected most readily if the alkali metal aluminosilicate zeolite undergoing treatment has not previously been subjected to a temperature above about 600° F.

Base exchange required for introducing the aforementioned metal ions may be accomplished by contacting the alkali metal aluminosilicate zeolite for a sufficient period of time and under appropriate temperature conditions to replace at least about 75 percent and preferably at least about 90 percent of the alkali metal originally contained in the aluminosilicate zeolite with ions of rare earth metal or a mixture of rare earth metal and other metals to effectively reduce the content of alkali metal of the resulting composite to below 4 weight percent and preferably less than 1 weight percent.

A wide variety of rare earth compounds can be employed with facility as a source of rare earth ions. Operable compounds include rare earth chlorides, bromides, iodides, carbonates, bicarbonates, sulfates, sulfides, thiocyanates, peroxysulfates, acetates, benzoates, citrates, fluorides, nitrates, formates, propionates, butyrates, valerates, lactates, molanates, oxalates, palmitates, hydroxides, tartarates, and the like. The only limitation on the particular rare earth metal salt or salts employed is that it be sufficiently soluble in the fluid medium in which it is used to give the necessary rare earth ion transfer. The preferred rare earth salts are the chlorides, nitrates and sulfates.

Representative of the rare earth metals are cerium, lanthanum, praseodymium, neodymium, samarium, europium, gadolinium, terbium, dysprosium, holmium, erbium, thulium, ytterbium, scandium, yttrium, and lutetium.

The rare earth metal salts employed can either be the salt of a single rare earth metal or mixtures of rare earth metals such as rare earth chlorides or didymium chlorides. As hereinafter referred to, a rare earth chloride solution is a mixture of rare earth chlorides consisting essentially of the chlorides of lanthanum, cerium, neodymium and praseodymium with minor amounts of samarium, gadolinium and yttrium. Rare earth chloride solutions are commercially available and the ones specifically referred to in the examples contain the chlorides of the rare earth mixture having the relative composition cerium (as $CeO_2$) 48 percent by weight, lanthanum (as $La_2O_3$) 24 percent by weight, praseodymium (as $Pr_6O_{11}$) 5 percent by weight, neodymium (as $Nd_2O_3$) 17 percent by weight, samarium (as $Sm_2O_3$) 3 percent by weight, gadolinium (as $Gd_2O_3$) 2 percent by weight, and other rare earth oxides 0.8 percent by weight. Didymium chloride is also a mixture of rare earth chlorides but having a lower cerium content. It consists of the following rare earths determined as oxides: lanthanum 45–56 percent by weight, cerium 1–2 percent by weight, praseodymium 9–10 percent by weight, neodymium 32–33 percent by weight, samarium 5–6 percent by weight, gadolinium 3–4 percent by weight, yttrium 0.4 percent by weight, and other rare earths 1–2 percent by weight. It is to be understood that other mixtures of rare earths are also applicable for the preparation of the novel compositions of this invention, although lanthanum, neodynium, praseodymium, samarium and gadolinium as well as mixtures of rare earth cations containing a predominant amount of one or more of the above cations are preferred since these metals provide optimum cracking activity.

A wide variety of metallic compounds can be employed with facility as a source of metallic cations and include both inorganic and organic salts of the metals of Group IB through Group VIII of the Periodic Table.

Representative of the salts which can be employed include chlorides, bromides, iodides, carbonates, bicarbonates, sulfates, sulfides, chlorates, perchlorates, thionates, thiocyanates, dithiocarbamates, peroxysulfates, acetates, benzoates, citrates, fluorides, nitrates, nitrites, formates, propionates, butyrates, valerates, lactates, malonates, oxalates, palmitates, hydroxides, tartarates and the like. The only limitation is that the salt be sufficiently soluble in the fluid medium to give the necessary ion transfer.

Representative metal salts which can be employed include calcium acetate, calcium perchlorate, calcium benzoate, calcium bromide, calcium chloride, calcium citrate, beryllium bromide, beryllium hydroxide, beryllium sulfate, barium acetate, barium bromide, barium citrate, barium malonate, barium nitrite, barium thiocyanate, cadmium sulfide, barium thionate, magnesium chloride, magnesium bromide, magnesium sulfate, magnesium sulfide, magnesium acetate, magnesium formate, magnesium tartarate, magnesium benzoate, zinc sulfate, zinc nitrate, zinc acetate, zinc chloride, zinc bromide, aluminum chloride, aluminum bromide, aluminum acetate, aluminum citrate, aluminum nitrate, manganese chloride, titanium bromide, titanium chloride, titanium nitrate, titanium sulfate, zirconium chloride, zirconium nitrate, zirconium sulfate, chromic acetate, chromic chloride, chromic nitrate, chromic sulfate, ferric chloride, ferric bromide, ferric acetate, ferrous chloride, ferrous lactate, ferrous sulfate, nickel chloride, nickel bromide and silver nitrate.

While water will ordinarily be the solvent in the base-exchange solutions used, it is contemplated that other solvents, although generally less preferred, may be used; in which case, it will be realized that the above list of representative compounds may be greatly expanded. Thus, in addition to aqueous solutions, alcoholic solutions, may be employed in producing the catalyst utilized in the present process. It will be understood that such metal compounds employed undergo ionization in the particular solvent used.

The metallic cation and/or rare earth cation may be present in the fluid medium in an amount varying within wide limits depending upon the precursor aluminosilicate and its silica to alumina ratio. Where the aluminosilicate starting material has a molar ratio of silica to alumina greater than 6.0, the fluid medium may have a pH of from 3 to 10.0; with a molar ratio between 5 and 6 the fluid medium may have a pH OF From 3.5 to 10.0 and preferably 4.5 to 8.5; with a molar ratio of silica to alumina less than 5.0, the fluid medium containing the rare earth cation and/or other metallic cation ranges from 4.5 to 10.0 and preferably from 4.5 to 8.5. Thus, depending on the silica to alumina ratio, the pH value varies within rather wide limits.

The temperature at which base-exchange is effected may vary widely, generally ranging from room temperature to an elevated temperature below the boiling point of the treating solution. The volume of base-exchange solution employed in any instance may vary widely. Generally, however, an excess is employed and such excess is removed from contact with the crystalline aluminosilicate zeolite after a suitable period of contact. The time of contact between the base exchange solution and crystalline zeolite in any instance is such as to effect substantial replacement of the alkali metal ions thereof with the desired metals. It will be appreciated that such period of contact vary widely depending on the temperature of the solution, the nature of the alkali metal aluminosilicate used, the particular metal compounds employed. Thus, the time of contact may extend from a brief period of the order of a few hours for small particles to longer periods of the order of days for large pellets. Generally, the time of contact will, depending on the various aforementioned factors, be within the range of 8 to 80 hours.

After the final base exchange treatment, the crystalline zeolite is removed from the treating solution. Anions introduced as a result of treating with the base exchange solutions are removed by water-washing the treated composite for such period of time until the same is free of said anions. The washed product is then dried, generally in air, to remove substantially all of the water therefrom. While drying may be effected at ambient temperature, it is generally more satisfactory to facilitate the removal of moisture by maintaining the product at a temperature between about 150° and about 600° F. for 4 to 48 hours.

The dried material is then subjected to an activating treatment essential to render the final composition catalytically active. Such treatment entails heating the dried material generally in air to a temperature within the approximate range of 500° to 1200° F. for a period of between 1 and 48 hours.

The particular metallic cations other than rare earth cations associated with the aluminosilicate is obviously dependent upon the particular reaction which is to be catalyzed. For example, if the catalyst was intended for the desulfurization of hydrocarbons, cations of metals such as cobalt, nickel, chromium, iron, copper and platinum would be desirable. However, the preferred catalyst compositions of this invention are those aluminosilicates containing both rare earth metal cations and cations of divalent metals. It has been found that the cations of calcium, magnesium and manganese in conjunction with rare earth cations are particularly advantageous for catalyzing a wide variety of chemical reactions especially the cracking of gas oil.

The relative amount of metallic cations to rare earth cations associated with the aluminosilicates of the instant invention is not narrowly critical and can vary over a wide range. However, particularly effective catalysts are obtained when the rare earth content ranges from 10–95 percent of the total equivalents of metallic cations, with 50–85 percent being preferred.

It is to be well understood that in the novel compositions of the instant invention, the total amount of rare earth equivalents and metallic equivalents need not be represented by a single metal. Therefore, compositions containing a mixture of rare earth cations as well as a mixture of metallic cations selected from Groups IB through VIII of the Periodic Table are encompassed within the scope of this invention. As has heretofore been pointed out, the particular metallic cations of Groups IB through VIII are governed by the specific reaction desired to be catalyzed.

While not wishing to be bound by any theory of operation, it nevertheless appears that the rare earth cations tend to impart stability to the aluminosilicate compositions, thereby rendering them far more useful for catalytic purposes, particularly in hydrocarbon conversion processes such as cracking. For reasons not completely understood, rare earth cations are extremely superior in this regard to all other metallic cations. It is to be understood that the degree of stability imparted wil generally vary as to the amount of rare earth cations associated with a particular aluminosilicate whereas the stability needed will obviously vary as to the particular reaction which is bening catalyzed.

It has been further found in accordance with the invention that catalysts of improved selectivity and having other beneficial properties in the conversion of hydrocarbons are obtained by subjecting the treated aluminosilicate to a mild steam treatment carried out at elevated temperatures of 800° to 1500° F., and preferably at temperatures of about 1000° to 1300°F. The treatment may be accomplished in an atmosphere of 100 percent steam or in an atmosphere consisting of steam and a gas which is substantially inert to the aluminosilicate. A similar treatment can be accomplished at lower temperatures and elevated pressures, e.g., 350° to 700° F. at 10 to about 200 atmospheres.

The catalysts prepared in accordance with the invention find extensive utility in a wide variety of hydrocarbon conversion processes including isomerization, dealkylation, alkylation, disproportionation, hydration of olefins, amination of olefins, hydrocarbon oxidation, dehydrogenation, dehydration of alcohols, desulfurization, hydrogenation, hydroforming, reforming, hydrocracking, oxidation, polymerization and the like. The catalysts are exceptionally stable and are particularly useful in such of the above and related processes carried out at temperatures ranging from ambient temperatures of 70° F. up to 1400° F, including such processes in which the catalyst is periodically regenerated by burning off combustible deposits. Because of their high catalytic activities, the catalysts are especially useful for effecting various hydrocarbon conversion processes such as alkylation, for example, at relatively low temperatures with small amounts of catalyst, thus providing a minimum of undesirable side reactions and operating costs.

By way of example, the dehydrogenation of hydrocarbons such as propane, butylene, butane, pentane, cyclopentane, cyclohexane, methyl cyclohexane and the like, can be carried out at temperatures ranging from about 300° to 1025° F. under atmospheric or superatmospheric pressures with a space velocity (LHSV) from 0.2 to 5000. For dehydrogenation, metals and oxides of metals such as platinum, palladium, rhodium, tungsten, iron, copper or nickel can be employed as promoters with the active aluminosilicate.

For the desulfurization of hydrocarbons, which involves largely hydrogenation, the oxides and sulfides of such metals as cobalt, molybdenum, chromium, iron, manganese, vanadium, copper and mixtures thereof may be used in conjunction with aluminosilicate. Desulfurization of shale distillates and the like may be carried out at temperatures between about 600° and 1000° F. under atmospheric or superatmospheric pressures with a space velocity (LHSV) between 0.2 and 50. The specific conditions within these ranges will vary with the feed stock undergoing desulfurization and the product desired.

The catalysts of the invention can be employed for hydrogenation of unsaturated aliphatic hydrocarbons, such as monoolfins, diolefins, etc., to form the corresponding saturated hydrocarbons, hydrogenation of unsaturated cyclic hydrocarbons, and hydrogenation of unsaturated alcohols, ketones, acids, etc. For hydrogenation reactions, the temperature may range up to 1000° F. under a pressure of about 10 to 3000 pounds or more, at a space velocity (LHSV) from about 0.5 to 5.0. The promoters which are normally employed with the aluminosilicate include the oxides of nickel, copper, iron and platinum group metals.

Hydrocracking of heavy petroleum residual stocks, cycle stocks, etc., may be carried out with active alumino-silicates promoted with about 0.05 to 10 percent by weight of a platinum metal such as platinum, palladium, rhodium, osmium, iridium, and ruthenium. The petroleum feed stock is cracked in the presence of the catalyst at temperatures between 400° and 825° F. using molar ratios of hydrogen to hydrocarbon charge in a range between 2 and 80. The pressure employed will vary between 10 and 2500 psig and the space velocity between about 0.1 and 10.

The catalysts of the invention may be further utilized for the alkylation of aromatic hydrocarbons or phenols and the conversion of olefinic, acetylenic and naphtenic hydrocarbons. Alkylation of aromatics and phenols may be carried out at temperatures between 15° and 850° F. under pressures of 0 to 1000 psig. The aromatizing reaction may be effected at temperatures between 350° and 1100° F. under atmospheric or elevated pressures. Other reactions which the catalysts find utility in include isomerization, polymerization, hydrogen transfer, oxidation of olefins to form the corresponding oxide, such as ethylene to ethylene oxide, propylene to propylene oxide, etc., as well as the oxidation of alcohol and ketones, etc. The catalyst composition of the invention also finds utility in processes for the oxidation of cyclohexane to adipic acid through the precursors cyclohexanone and cyclohexanol, as well as in the manufacture of caprolactam from caprolactone and ammonia. Additionally, the catalyst composites of the invention may be useful catalytically in processes for the production of vinyl chloride by oxidative-dehydrogenation reactions involving ethane and hydrogen chloride.

The high catalytic activities obtained by alumino-silicate compositions prepared in accordance with the invention are illustrated in connection with the carcking of a representative hydrocarbon charge. In the examples hereinafter set forth, the reference catalyst employed consisted of a conventional silica-alumina "bead" type cracking catalyst. The silica-alumina catalyst contained about 10 weight percent $Al_2O_3$ and the remainder $SiO_2$. In some instances it also contained a trace amount of $Cr_2O_3$, i.e., about 0.15 weight percent.

The cracking activity of the catalyst is further illustrated by its ability to catalyze the conversion of a Mid-Continent Gas oil having a boiling range of 450°–950° F. to gasoline having an end point of 410° F. Vapors of the gas oil are passed through the catalyst at temperatures of 875° F. or 900° F. substantially at atmospheric pressure at a feed rate of 1.5 to 8.0 Volumes of liquid oil per volume of catalyst per hour for ten minutes. The method of measuring the instant catalyst was to compare the various product yields obtained with such catalyst with yields at the same conversion level and at the same temperature. The differences (Δ values) shown herein represent the yields given by the present catalyst minus yields given by conventional catalyst. In these tests, the catalyst compositions of the invention were precalcined at about 1000° F. prior to their evaluation as a cracking catalyst.

Cracking operations carried out with the catalysts prepared in accordance with the invention may be effected at temperatures ranging from about 600° to 1300° F. under reduced, atmospheric or superatmospheric pressure. The catalyst can be utilized in the form of spheroidal particles or beads disposed in a stationary bed, or in the fluid procedures wherein the catalyst is disposed in a reaction zone to which catalyst is continuously added and from which catalyst is continuously removed. A particularly effective cracking process can be achieved when the catalyst is used to obtain the inherent advantages realized in the moving bed technique referred to as the Thermo-for catalytic cracking process.

The following examples will serve to illustrate the process of the invention without limiting the same:

EXAMPLE I

A crystalline sodium aluminosilicate having a uniform pore structure comprising openings characterized by an effective pore diameter in the range of 6 to 15 Angstroms was prepared from the following solutions.

Solution A—7% aqueous sodium hydroxide solution:

| | Lbs. |
|---|---|
| Sodium Hydroxide (NaOH) pellets (containing 75.5 wt. percent $Na_2O$) | 22 |
| Water | 286 |
| Total: | 308 |

Specific gravity of solution 1.077 at 68°F

Solution B—Sodium silicate solution:

| | |
|---|---|
| Solution A (7% NaOH) | 154 |
| Sodium Silicate (containing 8.8% $Na_2O$, 28.5% $SiO_2$, 62.7% $H_2O$ and having a specific gravity at 60°F of 1.392) | 77.5 |
| Total: | 231.5 |

Specific gravity of solution 1.172 at 68°F

Solution C—Sodium aluminate solution:

| | |
|---|---|
| Solution A(7% NaOH) | 154 |
| Water | 51.6 |
| Sodium aluminate Powder (containing 43.5% $Al_2O_3$ and 30.2% $Na_2O$) | 25.6 |
| Total: | 231.2 |

Specific gravity of solution 1.138 at 68°F

Solution C was poured into Solution B with vigorous agitation at room temperature. Lumps of gel formed which were broken by vigorous mixing. The entire mass was mixed thoroughly to a cream-like consistency. Such mixture was placed in containers of about 5 gallons capacity each. These containers were introduced into a water bath and allowed to stand at 205° F therein for 17 hours without agitation. At the end of this period, there was found to have formed in the containers a flocculent precipitate beneath a clear supernatant liquid. The containers were then removed from the bath. The precipitate was filtered and washed with water at room temperature until the pH of the filtrate was below 11.5. The resulting alumino-silicate crystalline product was dried in air at a temperature of approximately 250° F. and upon analysis was found to have a sodium content of 14.4 weight percent.

One-half (0.5) pound of the above crystalline sodium aluminosilicate was contacted at 150°F with 750 cc of an aqueous solution containing 1.0 pound of the chlorides of a rare earth metal mixture having the following composition:

|  | Percent wt. |
|---|---|
| Cerium (as $CeO_2$) | 20 |
| Lanthanum (as $La_2O_3$) | 11 |
| Praseodymium (as $Pr_6O_{11}$) | 3 |
| Neodymium (as $Nd_2O_3$) | 9 |
| Samarium (as $Sm_2O_3$) | 1 |
| Gadolinium (as $Gd_2O_3$) | 0.3 |
| Other rare earths | 0.1 |

A stream of nitrogen was bubbled through the mixture to provide continuous agitation. Every 24–28 hours, the solid was filtered, washed and contacted with fresh rare earth metal chloride solution as above. The rate of replacement by base exchange of the sodium ions with rare earth metal ions is shown below.

| No. of solution changes: | Percent weight sodium remaining after exchange |
|---|---|
| 0 | 14.4 |
| 13 | 3.5 |
| 16 | 1.6 |
| 21 | 1.2 |

Exchange was carried out as above over a period of 60 days at which time 97.7 percent of the original sodium content of the crystalline aluminosilicate had been replaced with rare earth metal ions. The product so obtained was filtered, washed, dried and pelleted to 1/8×1/16 inch particles. The pellets, upon being subjected to crystallinity analysis, were found to possess a partially crystalline structure. The pellets were then heat treated for 3 hours at 1100° F. and steam treated for 10 hours at 1200° F. and a pressure of 15 psig. The pellets, after such treatment, were again subjected to crystallinity analysis. It was found that steaming had no effect on crystallinity.

The rare earth metal aluminosilicate pellets resulting from the above preparation were employed in the cracking of a gas oil utilizing a temperature of 875° F, a liquid hourly space velocity of 4.5 and a catalyst to oil ratio of 1.33. The results obtained from such cracking are set forth in table I hereinbelow, wherein comparison is made between such results and those obtained under identical cracking conditions with the above described sodium aluminosilicate as well as aluminosilicates in which the sodium ion has been base-exchanged, in the manner above-described with reference to rare earth metal, with various other ions including lithium, barium, potassium, cobalt, magnesium, cadmium, strontium and calcium.

TABLE I

| Sieve Cation | % Cation Substitution | Conversion[1] | $C_4$-Free Gasoline[1] |
|---|---|---|---|
| Na |  | 24.4 | 13.0 |
| Li | 88.0 | 10.3 | 6.2 |
| Ba | 92.3 | 15.7 | 8.0 |
| K | 88.4 | 21.3 | 9.8 |
| Co | 89.8 | 22.1 | 12.7 |
| Mg | 93.2 | 32.3 | 23.2 |
| Cd | 92.0 | 39.7 | 12.0 |
| Sr | 98.5 | 44.9 | 23.1 |
| Ca | 94.1 | 48.7 | 31.3 |
| Rare earth metal | 97.9 | 90.0 | 35.5 |

[1] Wt. percent of charge

It will be seen from the foregoing data that the extent of conversion achieved with the rare earth metal alumino-silicate as compared with the other metal aluminosilicates was exceptionally high and that, likewise, the yield of gasoline was substantially improved utilizing the rare earth metal aluminosilicate as catalyst in comparison with the other metal aluminosilicates.

EXAMPLES 2–4

Rare earth metal aluminosilicates of varying sodium content were prepared as described in Example 1 by base exchange of crystalline sodium aluminosilicate with the rare earth metal chloride mixture. The weight percent sodium contents of the aluminosilicates obtained are shown below:

| Example: | % sodium |
|---|---|
| 2 | 0.76 |
| 3 | 1.23 |
| 4 | 3.5 |

The products were utilized as catalysts for cracking a Mid-Continent gas oil under varying conditions of temperature, catalyst to oil ratio and space velocity are shown below in table II.

TABLE II

| Wt. percent Na after exchange ($H_2O$-free) | 0.76 | 0.76 | 0.76 | 0.76 | 0.76 | 0.76 | 3.5 | 3.5 | 3.5 | 1.23 | 1.23 |
|---|---|---|---|---|---|---|---|---|---|---|---|
| CAT-D conditions: |  |  |  |  |  |  |  |  |  |  |  |
| Temp. (° F.) | 600 | 650 | 714 | 750 | 875 | 875 | 875 | 875 | 875 | 875 | 745 |
| LHSV | 4.5 | 4.5 | 4.5 | 4.5 | 4.5 | 9.0 | 4.5 | 4.5 | 4.5 | 9.0 | 9.0 |
| Catalyst/oil (vol.) | 1.33 | 1.33 | 1.33 | 1.33 | 1.33 | 1.33 | 1.33 | 1.33 | 0.67 | 1.33 | 1.33 |
| Yields: |  |  |  |  |  |  |  |  |  |  |  |
| Conversion (percent vol.) | 48.4 | 63.0 | 70.4 | 82.9 | 93.2 | 91.1 | 90.9 | [1]92.5 | 73.1 | [2]84.6 | [2]52.9 |
| $C_4$-free gasoline (percent vol.) | 32.1 | 42.9 | 48.2 | 55.6 | 41.3 | 51.1 | 47.5 | 49.8 | 46.6 | 55.2 | 42.2 |
| Total $C_4$ (percent vol.) | 6.2 | 10.7 | 14.8 | 20.4 | 37.3 | 30.9 | 30.0 | 30.9 | 20.8 | 24.6 | 6.8 |
| Dry gas (percent wt.) | 1.3 | 3.3 | 4.1 | 6.1 | 15.9 | 12.4 | 12.1 | 12.4 | 8.6 | 9.0 | 2.0 |
| Coke (percent wt.) | 17.3 | 15.9 | 15.9 | 15.9 | 19.0 | 16.6 | 18.0 | 17.8 | 10.1 | 12.6 | 11.3 |

[1] Steam treated 8 hrs. at 900° F., 0 p.s.i.g., 100% steam.
[2] Steam treated 10 hrs. at 1,200° F., 15 p.s.i.g.

It will be seen from the foregoing data that for the rare earth metal aluminosilicate containing 0.76 weight percent sodium, a maximum gasoline yield of 55.6 percent volume at 82.9 percent conversion was obtained at 750° F. Above this temperature gasoline starts to crack as indicated by decreased gasoline yield and the increased gas and coke yield. Increasing the space velocity from 4.5 to 9.0 at 875° F., resulted in a 10 percent increase in gasoline yield with about the same conversion. The rare earth metal aluminosilicate containing 3.5 percent sodium was about as active as the material containing 0.76 percent sodium.

To determine the effect of steam on the rare earth metal aluminosilicate catalyst, the composite containing 3.5 weight percent sodium was treated at mild steaming conditions (8 hours at 900° F.). The cracking results obtained on the steam treated material, as will be seen from table II, are similar to those obtained with the untreated material. The rare earth metal aluminosilicate containing 1.23 weight percent sodium was also steam treated for 10 hours at 1200° F. at a pressure of 15 psig. The gasoline yield was higher and the coke yield lower in this instance for the steam catalyst as compared to the untreated catalyst.

The beneficial results of steam treatment on the catalytic properties of the rare earth metal aluminosilicate catalyst are evident from a consideration of the comparative data set forth in table III hereinbelow wherein a rare earth metal aluminosilicate prepared by the general procedure of example 1 but containing 0.32 weight percent sodium was tested as a cracking catalyst before and after steaming for 162.5 hours at 1200° F and 15 psig. The results, along with those for a rare earth metal aluminosilicate containing 1.23 weight percent sodium which had been steamed for 85 hours at 1200° F. and 15 psig are shown:

TABLE III

| | | | |
|---|---|---|---|
| Wt. % Na in original sodium aluminosilicate($H_2O$-free) | 14.4 | 14.4 | 14.4 |
| Wt. % Na after cation exchange ($H_2O$-free) | 0.32 | 1.23 | 0.32 |
| Surface area (m.²/gm) | 438 | 449 | — |
| Steam treat (1200°F, 15 psig) hrs. | 0 | 85 | 162.5 |
| Cracking conditions: | | | |
| Temp. (°F) | 875 | 875 | 875 |
| LHSV | 9.0 | 9.0 | 9.0 |
| Catalyst/oil (vol.) | 1.33 | 1.33 | 1.33 |
| Yields: | | | |
| Conversion (% vol.) | 85.9 | 83.1 | 85.8 |
| $C_4$-free gasoline (percent vol.) | 50.4 | 60.9 | 59.0 |
| Total $C_4$(% vol.) | 29.0 | 20.7 | 24.5 |
| Dry gas (% wt.) | 11.0 | 7.5 | 9.5 |
| Coke (% wt.) | 12.7 | 9.5 | 9.0 |
| Gasoline/coke | 4.0 | 6.4 | 6.6 |
| Light HC analysis (wt. % chg.): | | | |
| $C_3$ | 8.07 | — | 6.46 |
| Normal, % wt. | 81.5 | — | 61.5 |
| Olefin, % wt. | 18.5 | — | 38.5 |
| $C_4$ | 18.79 | — | 16.08 |
| Isobutane, % wt. | 68 | — | 62.3 |
| Butylenes, % wt. | 12.3 | — | 18.4 |
| n-Butane, % wt. | 19.7 | — | 19.3 |

It will be seen from the foregoing data that while no substantial change in activity was observed with the steamed catalyst, an improved product distribution, i.e., the production of more gasoline and less coke, was achieved with the catalyst which had undergone steaming. Accordingly, in a preferred embodiment of the invention, the catalyst after undergoing thermal activating treatment is desirably subjected to treatment with steam at a temperature in the approximate range of 1000° to 1400° F. for a period of at least about 10 hours and, generally, between about 10 and about 200 hours.

EXAMPLE 5

One-half (0.5) pound of the crystalline aluminosilicate described in example 1 was contacted at a temperature of 150° F. with 750 cc of an aqueous solution containing 0.25 pound of beryllium chloride and 0.25 pound of a rare earth chloride mixture having the composition:

| | |
|---|---|
| Cerium (as $CeO_2$) | 20% Wt. |
| Lanthanum (as $La_2O_3$) | 11% Wt. |
| Praseodymium (as $Pr_6O_{11}$) | 3% Wt. |
| Neodymium (as $Nd_2O_3$) | 9% Wt. |
| Samarium (as $Sm_2O_3$) | 1% Wt. |
| Gadolinium (as $Gd_2O_3$) | 0.3% Wt. |
| Other rare earth | 0.1% Wt. |

Nitrogen was bubbled through the mixture to provide continuous agitation. Every 24–48 hours, the solid was filtered, washed and contacted with a fresh solution of the beryllium chloride and rare earth metal chloride. Exchange was carried out for a period of 60 days, at which time the product was found to contain, on a dry basis, 1.23 weight percent sodium, 6.3 weight percent beryllium, 2.9 weight percent cerium, together with substantial quantities of lanthanum, praseodymium, neodymium, and samarium. The product obtained was filtered, washed, dried and pelleted to 1/8 × 1/6 inch particles. The pellets were then heat treated for 3 hours at 1100° F. and steam treated for 10 hours at 1200°F and a pressure of 15 psig.

The following table shows the cracking data obtained when the catalyst was evaluated for cracking gas oil at 875° F.

TABLE

Cracking Data

| | |
|---|---|
| Conversion, Vol. % | 54.8 |
| LHSV | 4.5 |
| $C_4$-free gasoline, Vol. % | 47.9 |
| Total $C_4$'s, Vol. % | 10.6 |
| Dry Gas, Wt. % | 4.2 |
| Coke, Wt. % | 1.8 |
| Gasoline/Coke | 26.6 |

EXAMPLE 6

About 1 pound of the crystalline sodium aluminosilicate described in example 1 was contacted with 9 liters of an aqueous solution containing 1 pound of the rare earth metal chloride mixture having the composition set forth in Example and 1 pound of calcium chloride (reagent grade) in a continuous exchange column over a period of about 3 weeks at a temperature of 160° F. The exchanged powder was then washed in situ with 10 liters of distilled water. After washing was completed, the catalyst bed was removed from the column and the powder was washed four times using 1 liter of distilled water each time. The product was dried and pelleted to 1/8 × 1/16 inch particles. The resulting product upon analysis was found to contain, on a dry basis, 2.5 weight percent calcium, 4 weight percent rare earth metal, including 0.4 weight percent cerium, and 0.15 weight percent sodium.

The following table shows the cracking data obtained when the catalyst was evaluated for cracking gas oil at 875° F:

TABLE

Cracking Data

| | |
|---|---|
| Conversion, Vol. % | 84.1 |
| LHSV | 9.0 |
| $C_4$-free gasoline, Vol. % | 61.1 |
| Total $C_4$'s, Vol. % | 23.6 |
| Dry Gas, Wt. % | 7.1 |
| Coke, Wt. % | 10.1 |
| Gasoline/Coke | 6.1 |

EXAMPLE 7

A crystalline aluminosilicate of the X type was subjected to four contacts with a 5 percent by weight aqueous solution of aluminum chloride followed by 23 contacts with a 5 percent by weight aqueous solution of a mixture of rare earth chlorides hexahydrate. The aluminosilicate was then washed with water until the effluent was essentially free of chloride ions, dried and then treated for 30 hours at 1200° F. with steam at 15 psig. to yield a catalyst having a sodium content of 0.19 weight percent and an aluminum content, determined as aluminum oxide, of 40.4 weight percent.

The following table shows the cracking data obtained when the catalyst was evaluated for cracking gas oil at 900° F.

TABLE

Cracking Data

| | |
|---|---|
| Conversion, Vol. % | 46.4 |

| | |
|---|---|
| LHSV | 8.0 |
| $C_5$+ Gasoline, Vol. % | 39.6 |
| Dry Gas, Wt. % | 4.1 |
| Coke, Wt. % | 1.1 |

Δ Advantage

| | |
|---|---|
| $C_5$+ Gasoline, Vol. % | 4.6 |

EXAMPLE 8

A sodium aluminosilicate of the X type was treated with a 5 weight percent aqueous solution of rare earth chlorides hexahydrate at 180° F. until the sodium content was reduced to 2.3 percent by weight. The aluminosilicate was then contacted with 1 weight percent aqueous solution of $NiCl_2 \cdot 6 H_2O$ for 24 continuous hours at 180° F., washed until the effluent was essentially free of chloride ions, dried at 230° F., pelleted to 14 × 25 mesh, and calcined 10 hours in air at 1000° F. to yield a composition having catalytic properties.

We claim:

1. A crystalline aluminosilicate comprising cerium and cobalt cations, said crystalline aluminosilicate having a sodium content of less than about 4 percent by weight.

2. A crystalline aluminosilicate comprising cerium and beryllium cations, said crystalline aluminosilicate having a sodium content of less than about 1 percent by weight.

* * * * *